United States Patent [19]

Wood et al.

[11] Patent Number: 4,491,920

[45] Date of Patent: Jan. 1, 1985

[54] RATE POLARITY SHIFT WHEEL-SLIP CONTROL SYSTEM

[75] Inventors: James A. Wood, Versailles Boro; Richard J. Mazur, Pittsburgh, both of Pa.

[73] Assignee: American Standard Inc., Wilmerding, Pa.

[21] Appl. No.: 257,445

[22] Filed: Apr. 24, 1981

[51] Int. Cl.³ .............................................. B60T 8/02
[52] U.S. Cl. .................................... 364/426; 303/103; 303/105
[58] Field of Search ................ 364/426; 303/103, 105, 303/106, 107

[56] References Cited

U.S. PATENT DOCUMENTS

| | | | |
|---|---|---|---|
| 3,398,993 | 8/1968 | Sarbach et al. | 303/20 |
| 3,482,887 | 12/1969 | Sheppard | 303/106 |
| 3,740,652 | 6/1973 | Burgener | 328/137 |
| 3,822,921 | 7/1974 | Jones | 73/432 R |
| 3,912,034 | 10/1975 | Pallof | 180/197 |
| 4,005,911 | 2/1977 | Klatt et al. | 303/111 |
| 4,037,881 | 7/1977 | Fleagle | 303/106 |
| 4,212,499 | 7/1980 | Jones | 303/103 |

Primary Examiner—J. V. Truhe
Assistant Examiner—Saul M. Bergmann
Attorney, Agent, or Firm—J. B. Sotak

[57] ABSTRACT

A wheel-slip control system for a multiple truck vehicle having a speed sensor for producing signals representative of the velocity of each of the wheel axle units. A differentiator connected to each of the speed sensors for differentiating the velocity signals to obtain rate signals. A rate determining circuit for determining the most negative-going rate signals of each of the wheel axle units of each truck. A plurality of deceleration threshold and rate direction detectors and data processing logic to initiate a brake force reduction action on the truck experiencing a wheel slip, and a positive logical "OR" gate for sensing a polarity shift in the most negative rate signal to cause the data processing logic to reapply a braking action.

10 Claims, 4 Drawing Figures

RATE POLARITY SHIFT WHEEL-SLIP CONTROL SYSTEM

FIELD OF THE INVENTION

This invention relates to a rate polarity shift wheel-slip control system, and more particularly to a wheel-slip control system which initiates a brake force reduction when a wheel-slip occurs on any given wheel axle unit of a multiple truck vehicle and which utilizes the most negative-going deceleration rate to logically sequence a brake release and lap mode to cause the velocity of the slipping axle to be brought up to the velocity of the vehicle and to cause the brakes to be reapplied on the effected wheel truck unit when the most negative-going deceleration rate undergoes a positive-to-negative polarity shift.

BACKGROUND OF THE INVENTION

It is well known that there is a need for providing wheel-slip detection apparatus on modern high speed transit vehicles and railway trains in order to safely and efficiently slow down and/or stop the vehicles or train at a station or the like. A slip occurs when more braking force is exerted on a wheel axle unit than that which can be sustained by the available amount of frictional adhesion that exists between the wheels and the rails. The slipping condition causes the axle to decelerate at a higher rate than the vehicle deceleration. The object of wheel-slip control is to reduce the braking force to a point where it is lower than the equivalent force of the available adhesion. This will stop the axle from decelerating faster than the vehicle and will cause the axle to accelerate back up to the speed of the vehicle. It will be appreciated that during the time when an axle is decelerating faster than the speed of the vehicle, a velocity difference is developed between the axle and the vehicle. Previously, most wheel-slip controllers attempted to anticipate when the axle would return to the speed of the vehicle and then would strive to nullify the brake force reduction at that point. In most cases, the wheel-slip controller would make this decision on the basis of when the highest velocity axle on the vehicle and the slipping axle reached a given speed differential and/or when the acceleration rate of the axle under control reached a certain preset value. The major problem with these previous wheel-slip controllers resides in the fact that the preset points of anticipation are not always the right values for all adhesion and speed conditions. Under certain conditions, the prior wheel-slip controllers were susceptible to losses in vehicular performance and, in some cases, resulted in a locked axle returned or when it was erroneously anticipated that the axle was back up to the speed of the vehicle.

Accordingly, it is an object of the invention to provide a new and improved rate polarity shift wheel-slip control system.

Another object of this invention is to provide a unique wheel-slip control system which utilizes a rate polarity shift to determine when a brake force reduction on a slipping axle should be cancelled.

A further object of this invention is to provide a novel wheel-slip control system which employs a positive-to-negative polarity shift for ascertaining when a slipping axle has ceased to slip and has returned to the speed of the vehicle.

Yet another object of this invention is to provide an improved vehicle brake control system which cancels a brake force reduction when the rotation of a slipping wheel has been restored to the velocity of the vehicle.

Yet a further object of this invention is to provide a wheel-slip control comprising, means for producing signals representative of the velocity of each of the wheels, means for differentiating the velocity signals to obtain rate signals, means for determining the most negative-going rate signal of each wheel axle unit of each truck, means responsive to the most negative-going rate signal to initiate a brake force reduction action on the truck experiencing a wheel-slip condition, and means for sensing a polarity shift in the most negative rate signal to cause the responsive means to reapply a braking action.

SUMMARY OF THE INVENTION

Briefly, in accordance with the present invention, there is provided a wheel-slip control system which senses a slipping condition and causes a brake force reduction on the effected truck. A pulse generator produces signal pulses having a frequency proportional to the rotational speed of each of the wheel axle units of each truck. Actually, the apparatus uses the input signal pulses to gate a higher frequency clock, which is, in turn, counted to determine the speed. A differentiator differentiates and changes the velocity signals into rate signals. A rate determining circuit is responsive to the most negative-going rate signal for enabling a first deceleration threshold detector when the negative-going rate signal exceeds a first predetermined negative value. A data processing circuit including an enabling/disabling circuit and a main logic circuit is connected to the first deceleration threshold detector. The main logic circuit is connected to a dual solenoid slip control valve which initiates the release of the brakes on the effected truck when the first deceleration threshold detector is enabled. A second deceleration threshold detector is disabled when the most negative-going rate signal exceeds, in a negative direction, a second predetermined negative value. A rate direction detector is connected to the most negative rate determining circuit and is enabled when the excursion of the rate signal undergoes a directional change. The second deceleration threshold detector is enabled when the rate signal becomes less negative than the second predetermined negative value. Thus, the main logic circuit is conditioned to cause the dual solenoid slip control valve to maintain a constant pressure so that the brakes assume a lap position. The first deceleration detector is disabled and the enabling/disabling circuit is latched when the rate signal becomes less than the first predetermined value but brakes remain in their lap position. Now as the speed of the slipping wheel builds up, the rate signal transcends into a positive excursion at which point the enabling/disabling circuit is unlatched. Further, the rate differentiator is connected to a positive logical "OR" gate which is connected to the main logic circuit. The positive logical "OR" gate is turned ON by a positive rate signal. The unlatching and gating functions change the binary condition of the main logic circuit, but the dual solenoid slip control valve continues to hold the brakes in their lap position. The momentum and frictional losses will cause a directional change of the positive excursion of the rate signal, at which time the rate directional detector is disabled. The disabling of the rate directional detector causes a change in the binary condition of the main logic circuit, but again the dual solenoid slip control valve maintains the brakes in their lap position. Now, when the slipping wheel axle unit reaches the velocity of the vehicle, the positive rate excursion changes from a positive to a negative value. The polarity shift turns OFF the positive logical "OR" gate which causes the main logic circuit to revert to its initial binary condition which results in the application of pressure to the brake cylinder by the dual solenoid slip control valve so that the brakes are reapplied to the wheel axle units of the associated truck.

DESCRIPTION OF THE DRAWINGS

The above objects and other features and advantages of the present invention will become more readily apparent when considered in conjunction with the detailed description and the accompanying drawings wherein:

FIG. 1A is disposed to the left and FIG. 1B is disposed to the right of a wheel-slip control system of the present invention.

DETAILED DESCRIPTION OF THE INVENTION

Figure 1A:
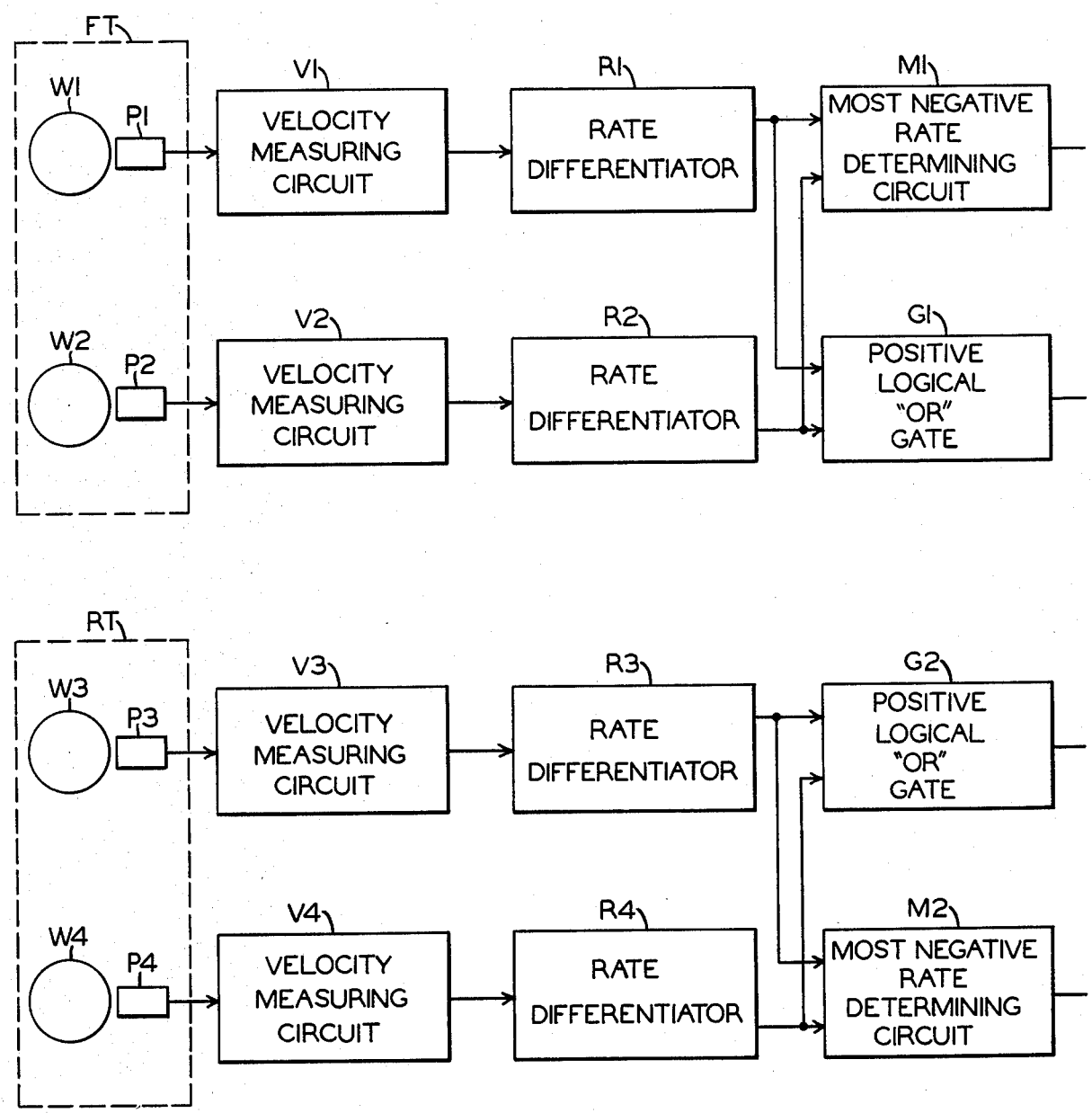
FIGS. 1A and 1B illustate a schematic circuit block diagram, which when placed in side-by-side relationship, namely, when
Figure 1B:
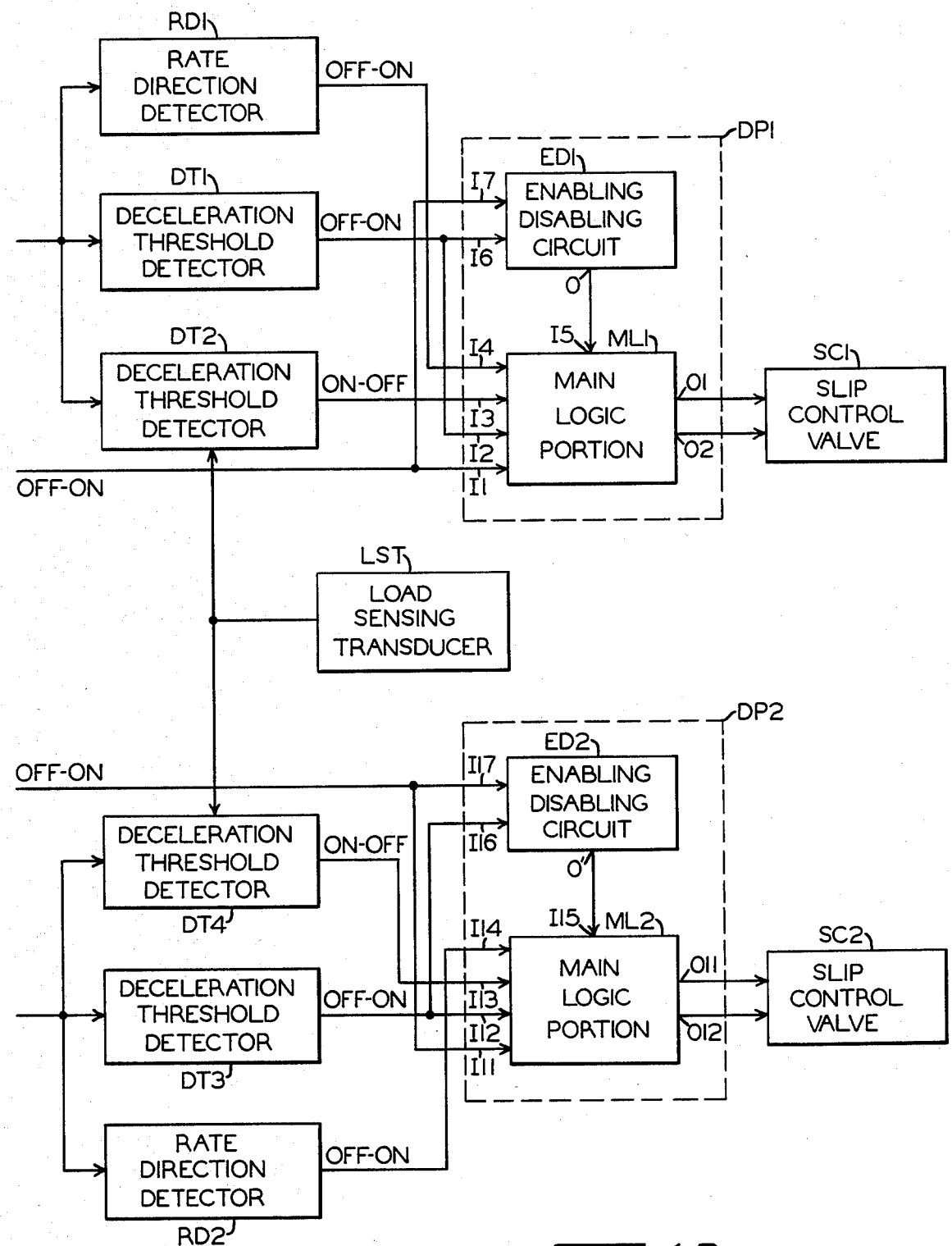

Referring now to the drawings, and in particular to FIGS. 1A and 1B, there is shown a front truck FT and a rear truck RT of a four-axle vehicle or car. The front truck FT includes a pair of wheel axle units W1 and W2 while the rear truck includes a pair of wheel axle units W3 and W4. The wheel axle units W1, W2, W3, and W4 have associated magnetic pickup devices P1, P2, P3, and P4, respectively, which take the form of conventional types of tachometer generators. Each of the tachometer generators is disposed in close proximity to a toothed gear which is driven by each of the wheel axle units. Thus, the magnetic generators sense the passing teeth of the driven gears to produce electrical signals or pulses having a frequency which is proportional to the angular rotation of the respective gears. That is, the tachometer generators produce alternating current signals having a frequency which varies with the rotating speeds or velocity of the respective wheel axle units. It will be seen that the output of each of the pickup devices P1, P2, P3, and P4 is connected to the input of respective velocity measuring circuits V1, V2, V3, and V4. Each of the velocity measuring circuits is basically a frequency-to-counter converter which includes a pulse shaper, counters, and buffer latches. It will be appreciated that each of the a.c. signals is fed to the pulse shaper which produces a constant-amplitude fixed-width square-wave pulse having a cyclical rate proportional to the given frequency. Next, the square-wave pulses are fed to a gating circuit which allows a high frequency clock input to the counters to produce an output which is inversely proportional to the frequency of the particular wheel axle unit being monitored. Then, the velocity count signals are fed to buffer latches which provide the necessary stabilization and isolation. As shown, the outputs of the velocity measuring circuits V1, V2, V3, and V4 are connected to the inputs of the respective rate differentiators R1, R2, R3, and R4. The differentiator circuits operate in the well-known manner to perform a time derivation for obtaining a rate signal having one polarity when the vehicle is decelerating and the opposite polarity when the vehicle is accelerating. Initially, let us describe the remaining portions or circuit elements which are related to the front truck FT, and then the remaining portions or circuit elements which are associated with the rear truck RT will be described hereinafter. It will be seen that the output rate signals from differentiating circuit R1 are fed to one of the inputs of a most negative rate determining circuit M1 as well as to one of the inputs of a two-input positive logical "OR" gate G1. Similarly, output rate signals from the differentiating circuit R2 are fed to the other input of the most negative rate determining circuit M1 as well as to the other input of the positive logical "OR" gate G1. It will be appreciated that the most negative rate determining circuit may be an analog network which may include a diode-tree network and an operational amplifying circuit for sensing and selecting which output signal from either or both of the rate differentiators R1 and R2 is the most negative-going voltage. It will be noted that the output from the most negative rate sensing circuit M1 is connected to the input of a rate direction RD1, a first deceleration threshold detector DT1, and a second deceleration threshold detector DT2. The rate direction detector RD1 may take the form of a time delay comparator circuit which is normally nonconductive or OFF and which is rendered conductive or turned ON if and when the monitored rate signal shifts from a positive polarity to a negative polarity and vice versa. The deceleration threshold detector DT1 may take the form of an avalanching and toggling operational amplifying circuit which is normally turned OFF and which is turned ON if and when the amplitude of the negative-going rate signal exceeds a first predetermined negative voltage value. The deceleration threshold detector DT2 may also take the form of an avalanching and toggling operational amplifying circuit which is normally conducting or turned ON and which is toggled OFF if and when the amplitude of the negative-going rate signal exceeds a second preselected negative voltage value.

Returning to the positive logical "OR" gate, it will be seen that the "OR" gate G1 is a conventional two-input gating circuit which is turned ON or rendered high when either one or both inputs are positive. As shown, the output of the "OR" gating circuit G1 is connected to an input I1 of a main logic portion ML1 and to the input I7 of an enabling/disabling circuit ED1 of data processing apparatus DP1. The main logic portion ML1 may include a plurality of logical gating, inverting, and amplifying circuits which receive and process the input data to cause either a high or low output signal on a pair of output leads O1 and O2. As shown, the output of the deceleration threshold detector DT2 is connected to an input I3 of the main logic portion ML1. Further, the output of the deceleration threshold detector DT1 is connected to an input I2 of the main logic portion as well as to the input I6 of the enabling/disabling circuit ED1. It will be seen that the output of the rate direction detector RD1 is connected to input I4 of the main logic portion ML1. As shown, the output O of the enabling/disabling circuit ED1 is connected to the input I5 of the main logic portion ML. The outputs O1 and O2 of the main logic portion are connected to the inputs of a slip control valve apparatus SC1 of the front truck FT. In practice, the slip control valve means SC1 takes the form of a conventional dual solenoid electropneumatic dump valve which is capable of applying the pressure during braking, venting the pressure during brake release, and holding the pressure during lapping, as will be described hereinafter.

Reverting now to the remaining components or associated circuit elements of the rear truck RT, it will be seen that the conventional differentiating circuits R3 and R4 are associated with a most negative rate determining circuit M2 as well as with a positive logical "OR" gate G2. That is, the output from the rate differentiator R3 is connected to one of the inputs of the most negative rate determining circuit M2 as well as to one of the two inputs of the positive logical "OR" gate G2. Similarly, the output of the rate differentiator R4 is connected to the other input of the most negative rate differentiating circuit M2 as well as to the other input of the two-input "OR" gate G2. As mentioned above, the most negative rate determining circuit M2 may take the form of an analog circuit which may include a diode-tree network and an operational amplifier for sensing and selecting which output signal from either or both of the rate differentiators R3 and R4 is the most negative-going voltage. It will be noted that the output from the most negative rate determining circuit M2 is connected to the inputs of a rate direction detector RD2, a first deceleration threshold detector DT3, and a second deceleration threshold detector DT4. The rate direction detector may take the form of a time delay comparator circuit which is normally nonconductive or OFF and which is rendered conductive or turned ON if and when the monitored rate signal shifts from a positive polarity to a negative polarity. The deceleration threshold detector DT3 may take the form of an avalanching and toggling operational amplifying circuit which is normally turned OFF and which is turned ON if and when the amplitude of the negative-going rate signal exceeds a first predetermined negative voltage value. The deceleration threshold detector DT4 may also take the form of an avalanching toggling operational amplifying circuit which is normally turned ON or conducting and which is turned OFF or rendered nonconductive if and when the negative-going rate signal exceeds a second preselected negative-going voltage value.

Like "OR" gate G1, the positive logical "OR" gate G2 is a conventional two-input gating circuit which is turned ON or rendered high when either one or both of the inputs are positive. It will be seen that the output of the "OR" gate G2 is connected to the input I11 of a main logic portion ML2 and to the input I17 of an enabling/disabling circuit ED2 of data processing apparatus DP2. The main logic portion ML2 may include a plurality of logical gating, inverting, and amplifying circuits which receive and process the input data to produce either a high or low output signal on a pair of output leads O11 and O12. As shown, the output of the deceleration threshold detector DT4 is connected to an input I14 of the main logic portion ML2. Further, the output of the deceleration threshold detector DT3 is connected to an input I13 of the main logic portion as well as to an input I16 of the enabling/disabling circuit ED2. It will be observed that the output of the rate direction detector RD2 is connected to the input I14 of the main logic portion ML2 while the output of the enabling/disabling circuit is connected to the input I15 of the main logic portion ML2. The outputs O11 and O12 of the main logic portion ML2 are connected to the inputs of a slip control valve apparatus SC2 for the rear truck RT. The slip control means also takes the form of a conventional dual solenoid electropneumatic dump valve which is capable of applying pressure during braking, venting the pressure to atmosphere during brake release, and holding the pressure at a constant value during lapping. Further, it will be appreciated that the slip control is modified according to the weight of the vehicle. Thus, the output of a load-sensing transducer LST is connected to the input of each of the deceleration threshold detectors DT2 and DT4 to vary the threshold or breakdown value in accordance with the weight of the vehicle.

In describing the operation of the slip control system, it is assumed that the components are intact and functioning properly and that the vehicle is undergoing a brake application so that a controlled deceleration or braking mode of operation is taking place. That is, during a braking mode of operation, the slip control valves SC1 and SC2 permit air to flow to the pneumatic brakes on the wheels of both trucks to maintain the proper braking level for the vehicle.

Figure 2:
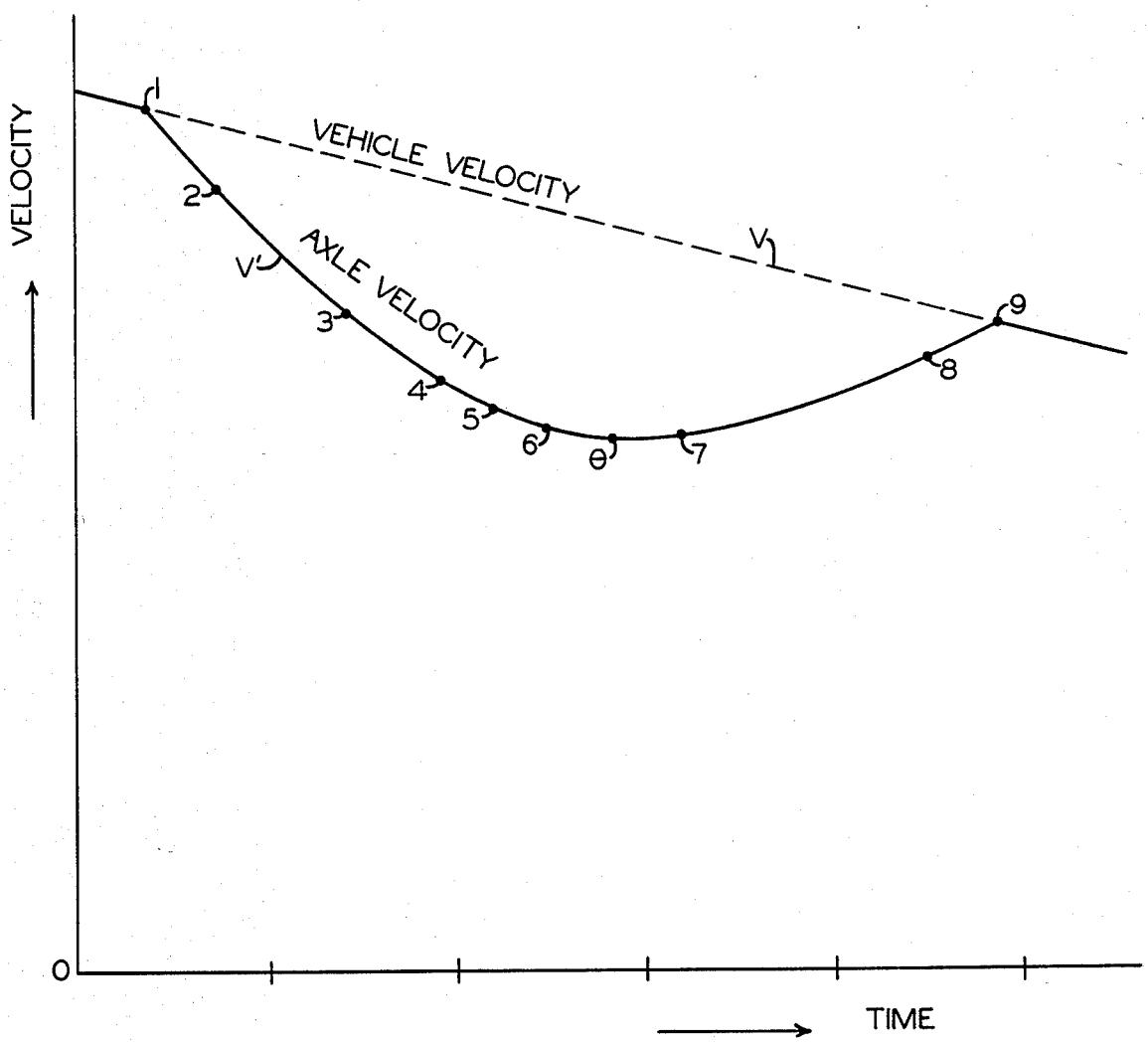
FIGS. 2 and 3 are graphical illustrations of the velocity and rate curves which will be useful in better understanding the operation of the wheel-slip control system of FIGS. 1A and 1B.
Figure 3:
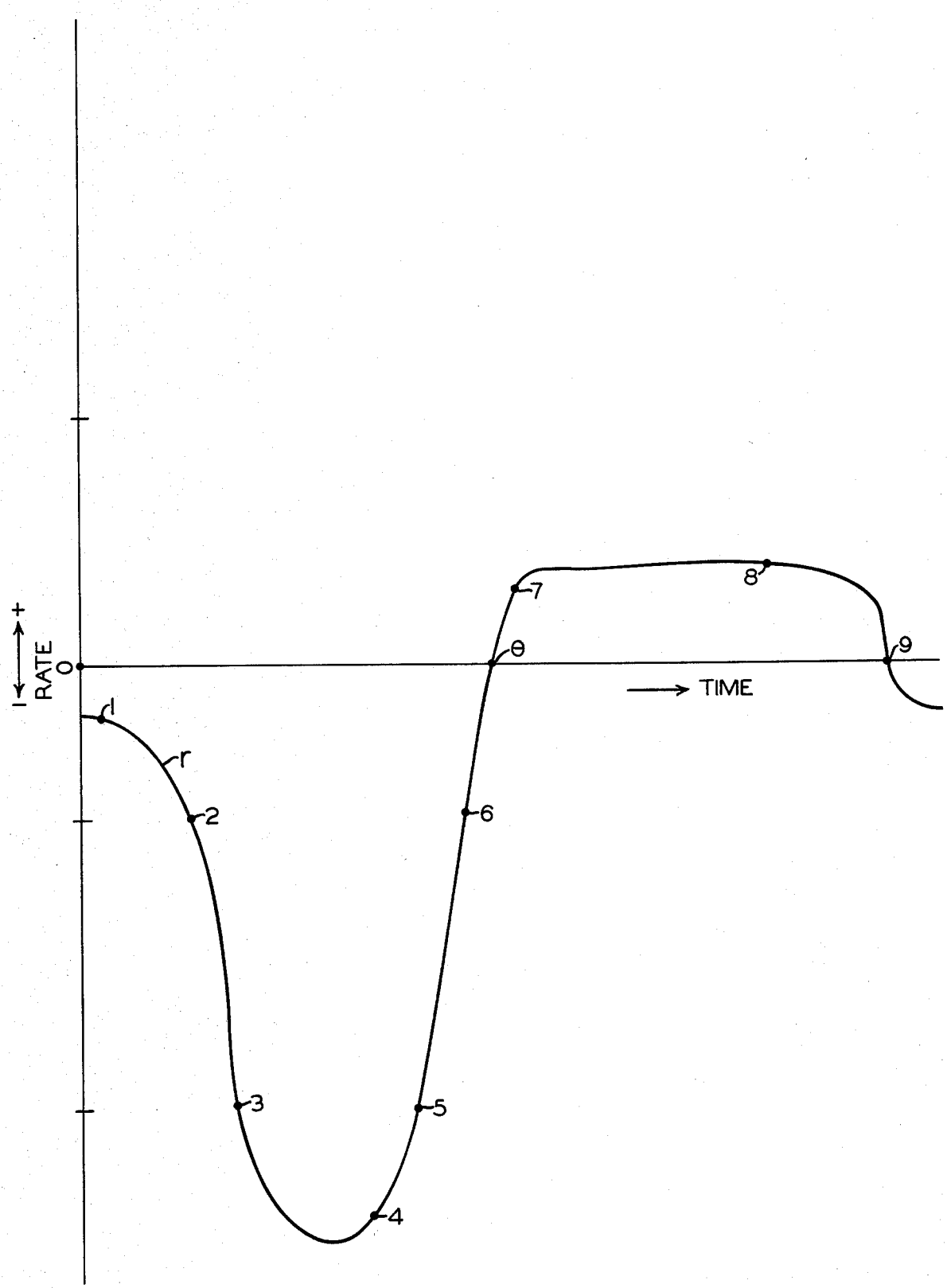

Let us now refer to the curves of FIGS. 2 and 3 in describing the operation of the slip control system of FIGS. 1A and 1B. Further, it will be helpful to refer to the following Truth Table for a better understanding of the function and operation of the various components of the present invention.

The following Truth Table illustrates the input and output conditions of each of the enabling/disabling circuits ED1 or ED2.

TRUTH TABLE 1

| Points on curves of FIGS. 2 & 3 | I7/I17 | I6/I16 | 0/0' |
|---|---|---|---|
| 1 | 0 | 0 | 0 |
| 2 | 0 | 1 | 1 |
| 3 | 0 | 1 | 1 |
| 4 | 0 | 1 | 1 |
| 5 | 0 | 1 | 1 |
| 6 | 0 | 0 | 1 |
| 7 | 1 | 0 | 0 |
| 8 | 1 | 0 | 0 |
| 9 | 0 | 0 | 0 |

It will be appreciated that when each of inputs I6 and I7 reverts to a binary 0 at point 6, the circuit ED1 latches and when I6 becomes a binary 1 and I7 is a binary 0, the circuit ED1 unlatches. Further, it will be understood that for safety purposes, a disabled condition takes precedence over an enabled condition since a component-failure or circuit-malfunction results in a disabled condition.

The following truth table illustrates the input and output conditions of each of the main logic portions ML1 or ML2 as well as the condition of the brakes of the vehicle.

TRUTH TABLE 2

| Points on curves of FIGS. 2 & 3 | I1/I11 | I2/I12 | I3/I13 | I4/I14 | I5/I15 | O1/O11 | O2/O12 | Brakes |
|---|---|---|---|---|---|---|---|---|
| 1 | 0 | 0 | 1 | 0 | 0 | 0 | 0 | Applied |
| 2 | 0 | 1 | 1 | 0 | 1 | 1 | 1 | Released |
| 3 | 0 | 1 | 0 | 0 | 1 | 1 | 1 | Released |

TRUTH TABLE 2-continued

| Points on curves of FIGS. 2 & 3 | I1/I11 | I2/I12 | I3/I13 | I4/I14 | I5/I15 | O1/O11 | O2/O12 | Brakes |
|---|---|---|---|---|---|---|---|---|
| 4 | 0 | 1 | 0 | 1 | 1 | 1 | 1 | Released |
| 5 | 0 | 1 | 1 | 1 | 1 | 1 | 0 | Lapped |
| 6 | 0 | 0 | 1 | 1 | 1 | 1 | 0 | Lapped |
| 7 | 1 | 0 | 1 | 1 | 0 | 1 | 0 | Lapped |
| 8 | 1 | 0 | 1 | 0 | 0 | 1 | 0 | Lapped |
| 9 | 0 | 0 | 1 | 0 | 0 | 0 | 0 | Applied |

Let us assume that the vehicle is in a braking mode and is decelerating so that the velocity of the vehicle is following the velocity curve v as shown in FIG. 2. As soon as the brakes are applied, namely, at time zero (0), the velocity of the vehicle begins to decrease and under ideal conditions the vehicle will follow the linear velocity curve v which is shown by the partially solid and dashed line. However, let us assume that the braking force on at least one of the wheel axle units of each one or both trucks is greater than the available adhesion which exists between the wheels and the rails so that a slipping condition becomes imminent. Assuming this condition is happening to wheel axle unit W1, it will be appreciated that this will cause the axle to decelerate at a higher rate than the vehicle deceleration. Thus, a slip condition occurs on wheel axle unit W1 and its velocity deviates from the linear velocity curve v at point 1 and begins to follow the nonlinear axle velocity curve v'. At point 1, the electrical states of the positive logical "OR" gates G1, G2, the deceleration threshold detectors DT2, DT4, the deceleration threshold detectors DT1, DT3, and the rate direction detectors RD1, RD2 are such that respective inputs I3, I13 of data processing units DP1 and DP2 are high or a logical "1", while the remaining inputs are low or a logical "0", as shown in the above-noted Truth Tables. As previously mentioned, the subject wheel-slip control system is a unique process of employing a polarity shift in the rate for determining when a slipping axle has stopped slipping and has returned to the speed of the vehicle.

In viewing the curves of FIGS. 2 and 3, it will be seen that as the axle velocity decelerates faster than the vehicle velocity, the deceleration rate of the axle unit W1 begins to change in a negative direction. The rate differentiator R1 conditions the most negative rate determining circuit M1 of the faster deceleration of wheel axle unit W1, and when the rate of deceleration reaches point 2, the output signal of the rate determining circuit M1 exceeds the avalanche voltage of the avalanching device, such as a Zener diode so that the toggling amplifier and, in turn, the deceleration threshold detector DT1 is turned ON and produces a high or logical "1" on inputs I2 and I6. The high signal on input I6 enables the enabling/disabling circuit ED1 which causes it to turn ON and to produce a high signal on output O. Thus, the input I5 becomes high or assumes a logical "1". In viewing Truth Table 2, it will be seen that when the inputs I2, I3, and I5 are high or a logical "1", the outputs O1 and O2 change from a low to a high. The high signals on outputs O1 and O2 cause the energization of the two solenoids of the slip control valve SC1 so that pressure in the brake line for the front track FT is vented. Thus, the pressure solenoid closes its valve while the exhaust solenoid opens its valve. The venting of the brake line to atmosphere causes the pressure to drop for both wheel axle units W1 and W2. However, the brakes are not instantaneously and fully released so that the frictional losses will cause the wheel axle unit W1 to continue to decelerate faster than the vehicle. When the rate reaches point 3, the output signal of the rate determining circuit M1 exceeds the avalanche voltage of the Zener diode of the deceleration threshold detector DT2. Thus, the detector DT2 turns OFF and causes a low or logical "0" to be developed on input I3. However, the outputs O1 and O2 remain high so that the pressure and exhaust valve solenoids remain energized to maintain the brakes in their releasing condition. In viewing FIG. 3, it will be seen that at some pont the deceleration rate will undergo a directional change, namely, the excursion change from a negative-going rate to a positive-going rate. That is, the negative peak of the rate curve r signifies the point at which the brake force reduction has stopped the axle rate from increasing faster than the vehicle rate. However, it should be noted that the axle rate is still greater in magnitude than the vehicle rate and that the velocity differential between the axle and vehicle continues to increase. Thus, when the positive-going rate reaches point 4, the rate direction detector RD1 is turned ON so that a high or logical "1" is developed on input I4. However, the outputs O1 and O2 remain unchanged so that the pressure and exhaust valve solenoids of slip control valve SC1 remain energized to maintain the brakes in their releasing condition. The deceleration rate continues to change in a positive direction so that when the rate reaches point 5, the level of the output signal from the most negative rate determining circuit M1 becomes less than the threshold value of the Zener diode of deceleration threshold detector DT2. Thus, the detector DT2 is turned ON so that input I3 again assumes a high or logical "1". The high signals on inputs I2, I3, I4, and I5 cause the output O2 to assume a low signal level. Thus, the exhaust valve solenoid of the slip control valve SC1 becomes de-energized to stop venting of the air pressure to atmosphere. The output O1 remains high so the pressure valve solenoid of slip control valve SC1 remains energized and blocks the application of pressure to the brake cylinders of wheel axle units W1 and W2. Thus, with the exhaust valve de-energized and with the pressure solenoid energized, the brakes assume a lap position or condition wherein the cylinders are not totally exhausted but are substantially lower than the normal brake pressure. Thus, the partial bleeding of the brake pressure causes a brake reduction and permits for faster brake application in case of an emergency. The wheel axle unit W1 continues to decelerate in a positive direction so that when the rate reaches point 6, the magnitude of the output signal of rate determining circuit M1 no longe exceeds the Zener level of deceleration threshold detector DT1. Thus, the detector DT1 is turned OFF so that the inputs I2 and I6 assume a low or "0" condition. However, the outputs O1 and O2 remain in the same electrical state so that the exhaust solenoid is de-energized and the pressure solenoid is energized, and the brakes remain in a lap position. In viewing the Truth Table 1, it will be see that when the input I6 assumes a low or "0" condition, the enabling/disabling circuit ED1 latches in order to maintain the output O in a high or "1" condition. The wheel axle unit W1 continues to decelerate in a positive direction so that the rate eventually reaches a zero value. That is, in view of FIG. 3, it will be seen that when the deceleration rate is zero at point θ, the velocity of the axle should begin to increase back up to the vehicle velocity as shown in FIG. 2. It will be observed that the velocity of the wheel axle unit W1 cotinues to increase and when the rate reaches point 7, the enabling/disabling circuit ED1 unlatches and causes its output O to assume a low or "0" condition. Further, the positive rate signal is employed to turn ON the positive logical "OR" gate G1. Thus, the input I5 shifts from a high or "1" condition to a low or "0" condition while the input I1 shifts from a low or "0" condition to a high or "1" condition but the brakes remain in a lap position. In viewing FIG. 3, it will be seen that the accelerating rate levels off and when the rate reaches point 8, the rate undergoes a directional change, namely, the curve r changes from a positive-going rate to a negative-going rate. Thus, when the rate reaches point 8, the rate direction detector RD1 is turned OFF so that the input I4 reverts to its low or "0" condition. However, the brakes remain in a lap position. It will be seen that the next point is the salient feature of the present slip control system. When the rate reaches point 9, a polarity shift occurs. With the brake force still reduced, the velocity of the wheel axle unit W1 will be the same as the velocity of the vehicle. It will be appreciated that due to the laws of physics and because the brakes are in the lap position, the braking force is not permitted to go to a zero value so that the axle rate will always assume a negative value. Thus, when the rate is zero at point 9, the output from the rate differentiator R1 no longer supplies a high or logical "1" to the input of "OR" gate G1. Thus, the positive logical "OR" gate G1 is turned OFF. The turning OFF of the "OR" gate G1 causes the inputs I1 and I7 to assume a low or "0" condition. Thus, the enabling/disabling circuit ED1 and the main logic portion revert to their initial states so that the brakes are reapplied to the wheel axle units W1 and W2. Thus, the same braking effort is effectively reinstituted on all of the wheel axle units so that the vehicle may be efficiently and safely brought under control.

It will be appreciated that if the wheel axle unit W1 or if and when any of the remaining wheel axle units W2, W3, or W4 begin to slip, the rate polarity shift wheel slip control system will operate in an identical fashion to cause a brake force reduction on the associated truck for bringing the velocity of the slipping wheel axle unit back up to the velocity of the vehicle. Further, it will be seen that, if the main logic portions ML1 and ML2 do not follow the exact sequence and the same binary digits at any of the nine points, the logic recognizes an error in the bits and initiates a corrective measure, such as, reverting back to the last-known valid byte.

The structural and functional operation of the components for the rear truck RT is substantially identical to that described above and, therefore, no detailed description appears necessary under the circumstances.

It will be understood that various alterations and changes may be made by those skilled in the art without departing from the spirit and scope of the subject invention. Further, with the advent of microprocessors and minicomputers, it is evident that the various functions may be processed by a suitably programmed computer which produces appropriate outputs. Therefore, it will be appreciated that the certain modifications, ramifications, and equivalents will be readily apparent to persons skilled in the art, and thus it is understood that the present invention should not be limited to the exact embodiment shown and described herein but should be accorded the full scope and protection of the appended claims.

Having thus described the invention, what we claim as new and desire to secure by Letters Patent, is:

1. A wheel-slip control system comprising, means for producing signals representative of the velocity of each of the wheels, means for differentiating the velocity signals to obtain rate signals, means for determining the most negative-going rate signal of each wheel axle unit of each truck, means responsive to the most negative-going rate signal to initiate a brake force reduction action on the truck experiencing a wheel-slip condition, and means for sensing a polarity shift in the most negative rate signal to cause said responsive means to reapply a braking action.

2. The wheel-slip control system as defined in claim 1, wherein said brake force reduction initiating means includes a first deceleration threshold detector which is rendered conductive when the most negative-going rate signal exceeds a first predetermined value.

3. The wheel-slip control system as defined in claim 1, wherein said brake force reduction initiating means includes a second deceleration threshold detector which is rendered nonconductive when the most negative-going rate signal exceeds a second predetermined value.

4. The wheel-slip control system as defined in claim 1, wherein said brake force reduction initiating means includes a rate direction detector which is rendered conductive when the excursion of the most negative-going rate signal undergoes a directional change.

5. The wheel-slip control system as defined in claim 1, wherein said brake force reduction initiating means includes a data processing circuit having an enabling/disabling circuit and a main logic circuit.

6. The wheel-slip control system as defined in claim 5, wherein a dual solenoid slip control valve is connected to said main logic circuit for controlling the condition of the brakes.

7. The wheel-slip control system as defined in claim 5, wherein said polarity shift sensing means includes a positive logical "OR" gate which causes said main logic circuit to establish a braking condition when the polarity of the most negative-going rate signal is shifted from a positive to a negative value.

8. The wheel-slip control system as defined in claim 1, wherein said velocity producing means includes a tachometer generator and frequency-to-voltage converter.

9. The wheel-slip control system as defined in claim 6, wherein said dual solenoid slip control valve is capable of applying, releasing, and lapping the brakes.

10. The wheel-slip control system as defined in claim 5, wherein said main logic circuit assumes a binary state upon the excursion of the most negtive-going rate signal.

* * * * *